United States Patent [19]
Card

[11] Patent Number: 5,057,821
[45] Date of Patent: Oct. 15, 1991

[54] FILTER SENTRY APPARATUS

[76] Inventor: Gary C. Card, 12114 Big Blue Rd., Nevada City, Calif. 95959

[21] Appl. No.: 657,404

[22] Filed: Feb. 19, 1991

[51] Int. Cl.$^5$ ............................................. G08B 21/00
[52] U.S. Cl. ..................................... 340/610; 340/607; 55/274; 55/DIG. 34; 116/268; 116/DIG. 25
[58] Field of Search .......................... 55/274, DIG. 34; 116/268, DIG. 25; 340/607, 610

[56] References Cited

U.S. PATENT DOCUMENTS

| | | | |
|---|---|---|---|
| 2,734,960 | 2/1956 | Reynolds | 340/610 |
| 2,789,175 | 4/1957 | Mahr | 340/607 |
| 3,070,676 | 12/1962 | Moseres | 340/610 |
| 3,077,988 | 2/1963 | Anderson et al. | 340/607 |

Primary Examiner—Bernard Nozick
Attorney, Agent, or Firm—Leon Gilden

[57] ABSTRACT

An apparatus including a housing secured to a filter web, wherein the housing includes a reciprocating rod directed orthogonally through the housing relative to the filter web, whereupon plugging of the filter web permits the rod to be directed through the housing to effect actuation of a switch therewithin. The rod mounts a magnet to track a plurality of contacts of a switch within the housing to effect actuation of an audible and visual alarm.

5 Claims, 4 Drawing Sheets

PRIOR ART

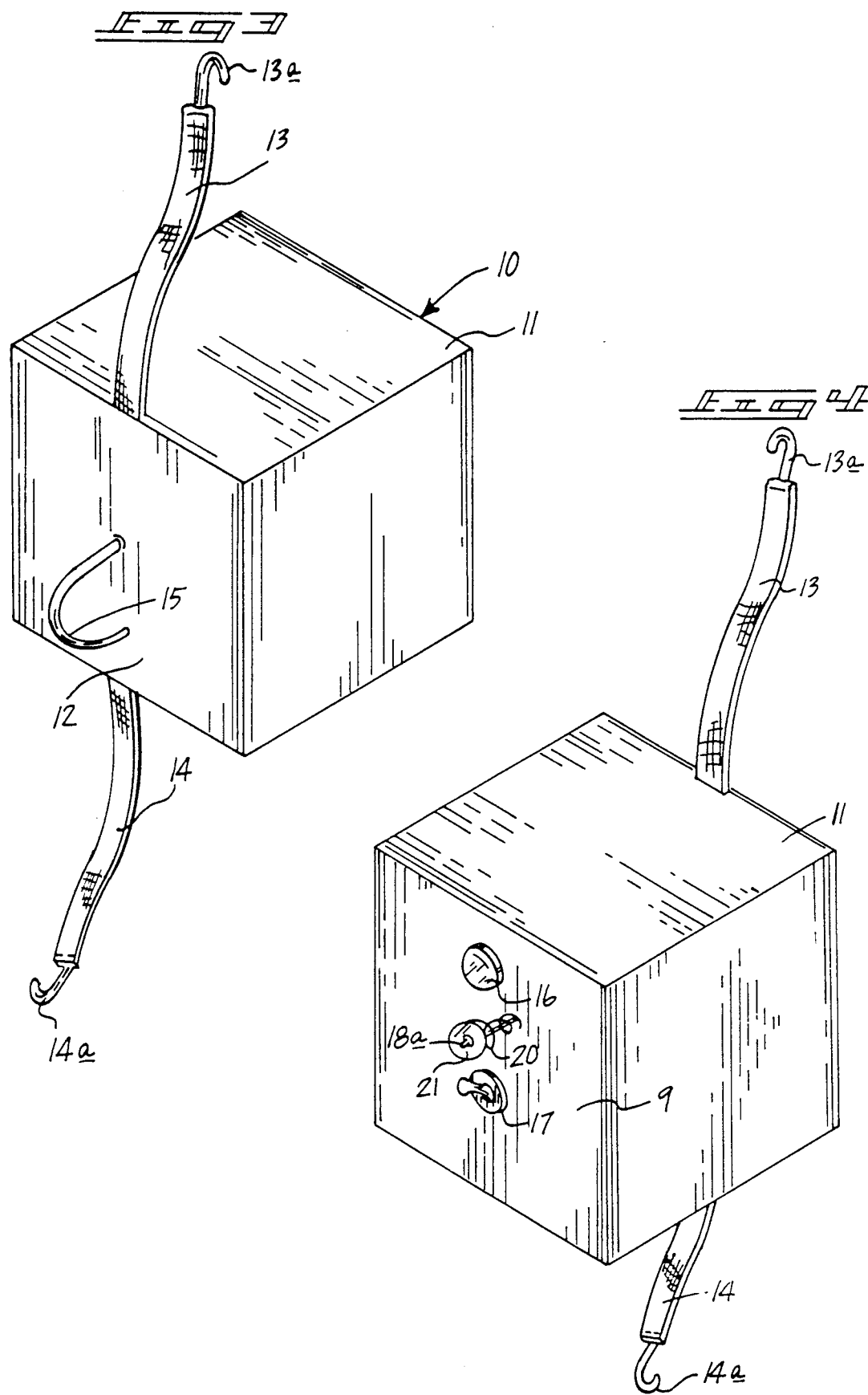

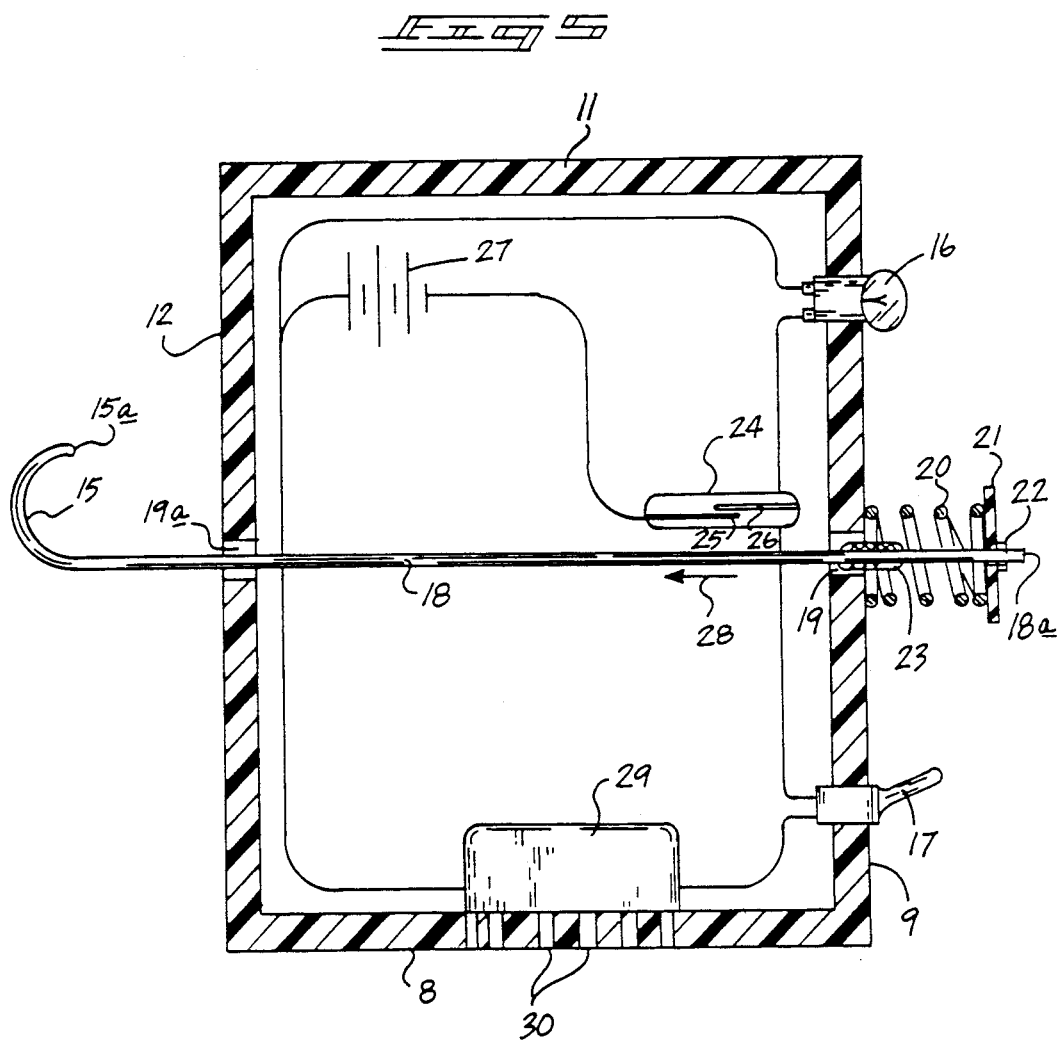

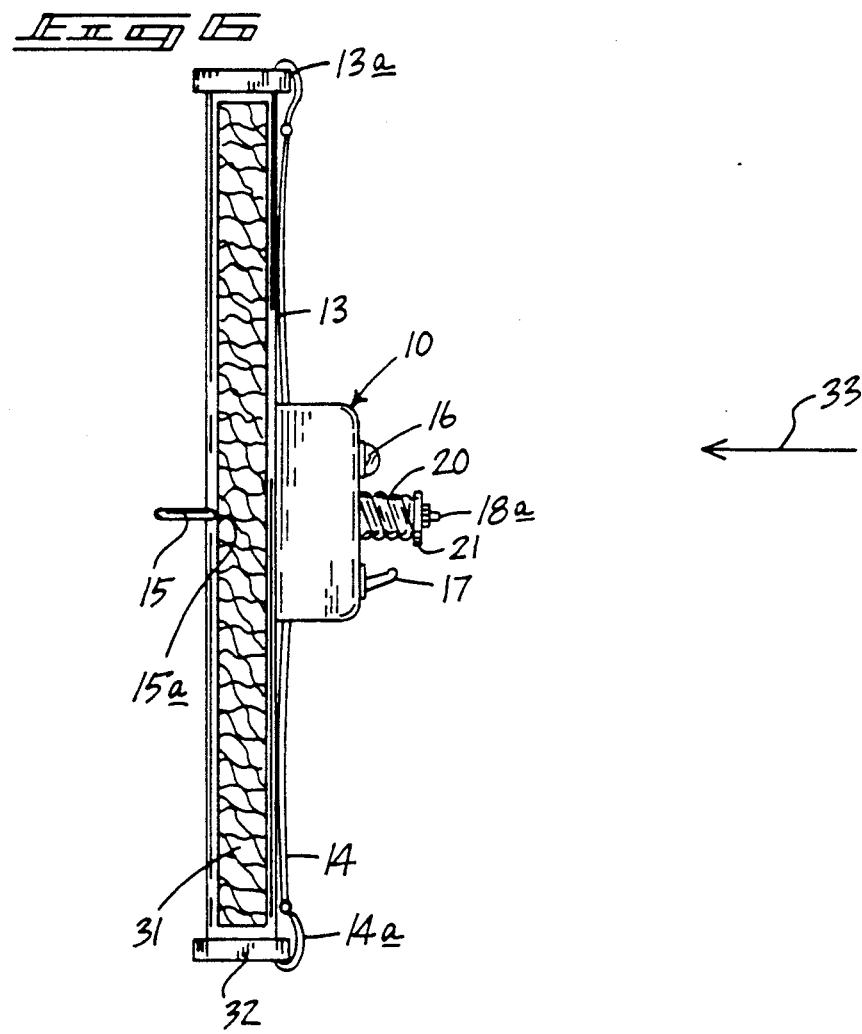
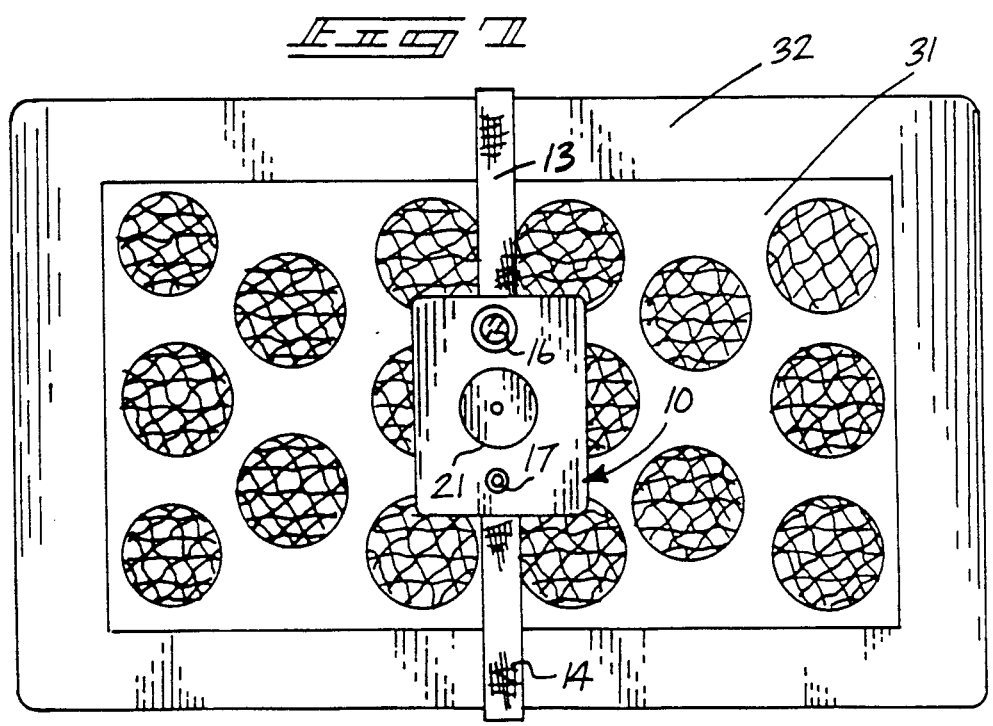

FILTER SENTRY APPARATUS

BACKGROUND OF THE INVENTION

1. Field of the Invention

The field of invention relates to alarm apparatus, and more particularly pertains to a new and improved filter sentry apparatus wherein the same effects actuation of an audible and visual alarm upon a filter requiring replacement or servicing.

2. Description of the Prior Art

Signal apparatus has been utilized in the prior art to effect alert upon plugging of a filter member. Such apparatus is found and may be exemplified by U.S. Pat. No. 4,321,070 to Bede wherein a whistle member is mounted within the filter upon clogging of the filter, whereupon air flow is directed through the whistle to alert an individual of need to replace or service a filter member.

U.S. Pat. No. 4,491,458 to Sunter sets forth a filter monitoring organization for monitoring pressure differentials across a collector to alert an individual relative to clogging of an associated filter.

U.S. Pat. No. 4,153,003 to Willis sets forth an indicator arranged for location of a pressure differential through a fluid system to note need of service of the system.

U.S. Pat. No. 4,445,456 to Nelson sets forth an air filter communication device to indicate a pressure differential resulting from clogged filter relative to the organization.

Accordingly, there continues to be a need for a new and improved filter sentry apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of filter alert apparatus now present in the prior art, the present invention provides a filter sentry apparatus wherein the same sets forth a housing mountable to an associated filter web to indicate clogging of an associated filter through a visual and audible signal organization. As such, the general purpose of the present invention, which will be described subsequently in greater detail, is to provide a new and improved filter sentry apparatus which has all the advantages of the prior art filter alarm apparatus and none of the disadvantages.

To attain this, the present invention provides an apparatus including a housing secured to a filter web, wherein the housing includes a reciprocating rod directed orthogonally through the housing relative to the filter web, whereupon plugging of the filter web permits the rod to be directed through the housing to effect actuation of a switch therewithin. The rod mounts a magnet to track a plurality of contacts of a switch within the housing to effect actuation of an audible and visual alarm.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved filter sentry apparatus which has all the advantages of the prior art filter alarm apparatus and none of the disadvantages.

It is another object of the present invention to provide a new and improved filter sentry apparatus which may be easily and efficiently manufactured and marketed.

It is a further object of the present invention to provide a new and improved filter sentry apparatus which is of a durable and reliable construction.

An even further object of the present invention is to provide a new and improved filter sentry apparatus which is susceptible of a low cost of manufacture with regard to both materials and labor, and which accordingly is then susceptible of low prices of sale to the consuming public, thereby making such filter sentry apparatus economically available to the buying public.

Still yet another object of the present invention is to provide a new and improved filter sentry apparatus which provides in the apparatuses and methods of the prior art some of the advantages thereof, while simultaneously overcoming some of the disadvantages normally associated therewith.

Still another object of the present invention is to provide a new and improved filter sentry apparatus wherein the same sets forth an organization for retrofit to existing filter webbing to provide alert of clogging of such webbing during use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric rear view of the instant invention.

FIG. 4 is an isometric frontal view of the instant invention.

FIG. 5 is an orthographic cross-sectional illustration of the housing of the instant invention.

FIG. 6 is an orthographic cross-sectional illustration of the housing mounted to an associated filter web.

FIG. 7 is an orthographic frontal view, taken in elevation, of the invention in operative association with the filter web.

DESCRIPTION OF THE PREFERRED EMBODIMENT

Figure 1:
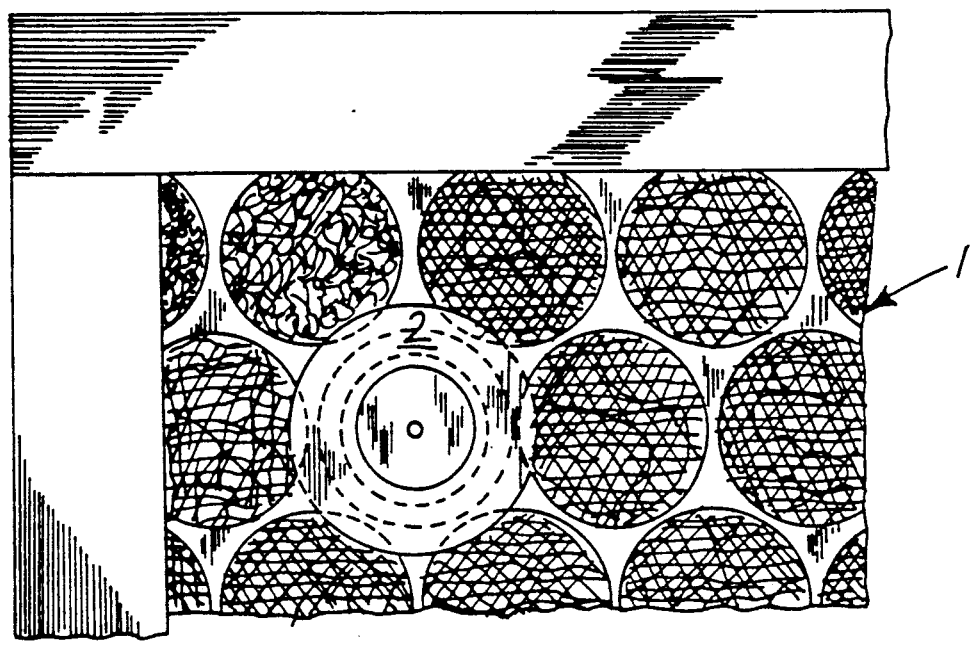
FIG. 1 is an orthographic frontal view of a prior art filter alert apparatus.
Figure 2:
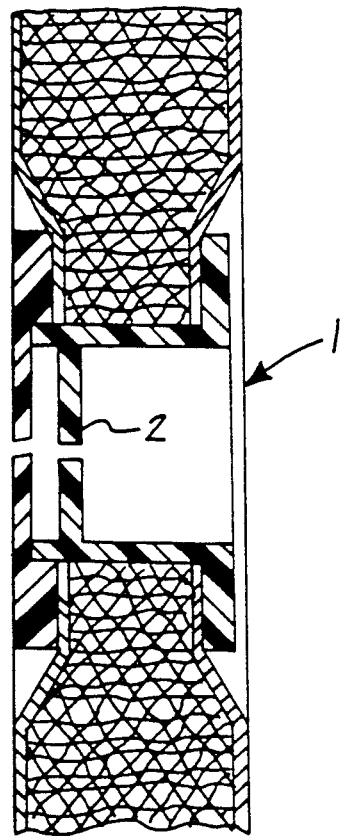
FIG. 2 is an orthographic cross-sectional illustration of a prior art filter alert apparatus as set forth in FIG. 1.

With reference now to the drawings, and in particular to FIGS. 1 to 7 thereof, a new and improved filter sentry apparatus embodying the principles and concepts of the present invention and generally designated by the reference numeral 10 will be described.

FIG. 1 illustrates a prior art filter alert organization 1 in association with a filter, wherein a whistle member 2 is mounted through the filter to effect a shrill tone for signalling a clogged condition within the filter webbing.

More specifically, the filter sentry apparatus 10 of the instant invention essentially comprises a housing including a top wall 11, a rear wall 12, a forward wall 9, a bottom wall 8 (see FIG. 5), and spaced side walls, as illustrated. A first elastomeric strap 13 is mounted medially of an intersection of the top and rear wall, with a second elastomeric strap 14 mounted at an intersection of the bottom and rear wall. The first and second straps extend orthogonally beyond the top and bottom walls and include a respective first and second strap hook 13a and 14a for securement of the housing to an associated filter housing 32 (see FIGS. 6 and 7). An indicator light 16 is mounted to the forward wall 9 and in electrical communication with an on/off switch 17 to effect shutting down of the organization when its use is not desired, as well as communication electrically through an actuator switch 24 mounted within the housing. The actuator switch 24 includes an actuator switch first contact leg 25 and a second contact leg 26, wherein the first contact leg is formed of a non-ferro attractive material, such as aluminum, and wherein the second leg 26 is formed of a ferro magnetic material, such as steel and the like. A battery 27 is mounted within the housing in electrical communication with an audible signal device 29, such as a piazza-electric audible generating disk. An actuator rod 18 is slidably mounted through the housing and normally biased in a first position defined by a first spacing between a free terminal end of a signal hook member 15 formed to a rear terminal end of the actuator rod 18 that projects through the rear wall 12 of the housing through a rear wall opening 19a. A forward wall opening 19 is aligned with the rear wall opening 19a, and the forward wall 19 is directed through the forward wall 9, wherein an actuator rod forward terminal end 18a projects beyond the forward wall 19 in an orthogonal relationship, with a captured coil spring 20 mounted between a coil spring plate 21 and the exterior surface of the forward wall 9. The fastener 22 mounts the plate 21 to the actuator rod 18 adjacent the forward terminal end 18a. A magnetic cylinder 23 is mounted in surrounding relationship relative to the rod 18 and positioned within the forward wall opening 19 in the first spacing of the rear terminal end 15a relative to the rear wall. When a filter web 31 is clogged or requires servicing and the housing mounted to the filter housing 32 to an upper and lower lateral legs thereof as illustrated in FIGS. 6 and 7, the filter web 31 will deflect relative to the filter housing 32 and retract the actuator rod 18 within the housing and thereby position the magnetic cylinder 23 adjacent the actuator switch 24 to complete electrical circuitry and direct electrical energy to the indicator light 16 and the audible signal device 29 and thereby displace the rear terminal end 15a to a second spacing spaced from the rear wall 12. It should be noted, as illustrated in FIG. 6, that the housing is mounted confronting air flow directed towards the housing and the filter web to properly orient the filter web when it is deflected to permit actuation of the audible and visual signals of the sentry apparatus.

It should be noted that the audible signal device 29 is mounted within the housing overlying the rear wall and a matrix of bottom wall openings 30 to minimize dirt and the like from contaminating the audible signal device in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A filter sentry apparatus comprising, in combination,
   a housing, the housing including a forward wall, a rear wall, a top wall, and a bottom wall, and
   a bottom wall, and
   a first elastomeric strap mounted to a first intersection between the top wall and rear wall, and a second elastomeric strap mounted to a second intersection between the bottom wall and the rear wall, and
   the first elastomeric strap including a first hook mounted at a free terminal end thereof, and the second elastomeric strap including a second hook mounted at a free terminal end thereof, and
   the housing including a visual indicator member mounted in the housing, and
   an audible indicator mounted through the housing, and the rear wall including a rear wall opening, and the forward wall including a forward wall opening, wherein the forward and rear wall openings are aligned relative to one another, and an actuator rod extending through the housing through the forward wall opening and the rear wall opening, and the actuator rod including a forward terminal end extending forwardly and orthogonally relative to the forward wall, and a rear terminal end extending rearwardly of the rear wall of the housing, and the rear terminal end defining a hook member spaced from the rear wall defined by a first spacing in a first position of the actuator rod, and the actuator rod including actuating means mounted in surrounding relationship relative to the actuator rod when the actuator means are positioned within the forward wall opening in the first position, and an actuator switch mounted within the housing, and a battery mounted within the housing, wherein the battery and the actuator switch are in electrical communication between the indicator light member and the audible signal member, and the actuator rod displaceable to a second position positioning the hook member to a second spacing relative to the rear wall, wherein the second spacing is greater than the first spacing to effect retraction of the actuator means within the housing adjacent the actuator switch to effect actuation of the indicator light member and the audible signal member.

2. An apparatus as set forth in claim 1 wherein the actuator switch includes a first contact leg formed of electrically conductive non-magnetically attractive material, and the second contact leg formed of a magnetically attractive material, whereupon positioning of the actuator means adjacent the actuator switch effects communication within the first and second legs to actuate the indicator light member and the audible signal device.

3. An apparatus as set forth in claim 2 wherein the actuator means includes a magnetic cylinder mounted about and fixedly secured to the actuator rod.

4. An apparatus as set forth in claim 3 wherein the forward terminal end of the actuator rod includes a spring plate mounted orthogonally relative to and adjacent the forward terminal end, and a coil spring captured between the spring plate and the forward wall to bias the actuator rod in the first position defining the first spacing.

5. An apparatus as set forth in claim 4 including a filter housing, and the filter housing including a filter web mounted coextensively between the filter housing, and the filter housing including a top leg and a bottom leg, and the first hook mounted to the top leg and the second hook mounted to the bottom leg, and the housing positioned overlying a forward face of the filter web, and the signal hook member defined by the actuator rod positioned in communication with the rear face of the filter web, whereupon deflection of the filter web effects positioning of the switch hook member from the first spacing to the second spacing.

* * * * *